United States Patent
Roesgen et al.

(10) Patent No.: US 7,392,832 B2
(45) Date of Patent: Jul. 1, 2008

(54) PNEUMATIC TIRE HAVING TREAD BLOCKS WITH SKEWED WALLS

(75) Inventors: Alain Francois Emile Roesgen, Asselborn (LU); Bernard Jean Francois Croissant, Bastogne (BE); Michel Constant, Bastogne (BE)

(73) Assignee: The Goodyear Tire & Rubber Company, Akron, OH (US)

(*) Notice: Subject to any disclaimer, the term of this patent is extended or adjusted under 35 U.S.C. 154(b) by 204 days.

(21) Appl. No.: 11/023,796

(22) Filed: Dec. 28, 2004

(65) Prior Publication Data

US 2006/0137792 A1    Jun. 29, 2006

(51) Int. Cl.
B60C 11/11    (2006.01)
B60C 11/13    (2006.01)

(52) U.S. Cl. ............... 152/209.1; 152/209.18; 152/209.21; 152/209.24; 152/902

(58) Field of Classification Search ............. 152/209.1, 152/209.18, 209.21, 209.24, 209.28, 902; 156/110.1
See application file for complete search history.

(56) References Cited

U.S. PATENT DOCUMENTS

| | | | |
|---|---|---|---|
| 1,349,055 A | 8/1920 | Forbes | |
| 1,413,190 A | 4/1922 | Rapson | |
| 4,796,683 A * | 1/1989 | Kawabata et al. | 152/209.24 |
| 4,819,704 A * | 4/1989 | Misawa et al. | 152/902 |
| 4,854,358 A | 8/1989 | Takeuchi | 152/209 R |
| 4,913,208 A | 4/1990 | Anderson et al. | 152/209 R |
| 5,016,696 A | 5/1991 | Bonko et al. | |
| 5,097,882 A | 3/1992 | Adam et al. | 152/209 R |
| 5,450,885 A * | 9/1995 | Hanya | 152/209.28 |
| 5,603,785 A | 2/1997 | Weber et al. | 152/209 A |
| 5,669,993 A * | 9/1997 | Moseley et al. | 152/902 |
| 5,891,276 A | 4/1999 | Takahashi | 152/209 R |
| 5,964,267 A * | 10/1999 | Poque et al. | 152/209.24 |
| 6,527,024 B1 * | 3/2003 | Ashmore | 152/209.24 |
| 6,786,257 B1 * | 9/2004 | Koide | 152/902 |
| 2003/0205076 A1 | 11/2003 | Shimura | 73/8 |
| 2006/0144492 A1 * | 7/2006 | Nguyen et al. | 152/209.18 |

FOREIGN PATENT DOCUMENTS

| | | |
|---|---|---|
| EP | 0605849 A1 | 7/1994 |
| EP | 0751013 A | 1/1997 |
| GB | 748078 | 4/1956 |
| JP | 61-200007 * | 9/1986 |
| JP | 01-204805 * | 8/1989 |
| JP | 02241805 A2 | 9/1990 |

(Continued)

OTHER PUBLICATIONS

Machine translation for Japan 11-286204 (Jun. 22, 2007).*

(Continued)

*Primary Examiner*—Steven D Maki
(74) *Attorney, Agent, or Firm*—Wood, Herron & Evans, LLP

(57) ABSTRACT

A pneumatic tire with an improved balance between noise reduction and hydroplaning resistance as the tread wears. The tread of the pneumatic tire includes skewed tread blocks having walls that, as the tread wears, change the character of the lateral and circumferential channels in the tire footprint to better optimize noise reduction and hydroplaning resistance.

9 Claims, 5 Drawing Sheets

FOREIGN PATENT DOCUMENTS

| | | | |
|---|---|---|---|
| JP | 04-100706 A | | 4/1992 |
| JP | 4-345503 | * | 12/1992 |
| JP | 11-286204 | * | 10/1999 |
| JP | 2002-301908 | * | 10/2002 |
| WO | WO 00/30876 | * | 6/2000 |

OTHER PUBLICATIONS

European Patent Office, European Search Report issued in corresponding European Patent Application No. EP 05 11 2463 dated Apr. 18, 2006.

* cited by examiner

PNEUMATIC TIRE HAVING TREAD BLOCKS WITH SKEWED WALLS

FIELD OF THE INVENTION

The present invention generally relates to pneumatic tires and, more particularly, to a pneumatic tire characterized by a pattern arrangement with tread blocks having a road-contacting surface that changes its geometrical appearance as the tire wears.

BACKGROUND OF THE INVENTION

Conventional tires include a tread with a tread pattern that, when the tire is loaded, defines a footprint providing a frictional engagement with the road. The tread pattern is segmented into a plurality of raised blocks defined and separated by intersecting circumferential and transverse grooves. The grooves are necessary to provide flexibility and water removal while the blocks determine the control, acceleration and braking characteristics of the tire. The circumferential grooves are positioned such that the raised blocks are arranged in columns that extend circumferentially about the tire circumference.

The block dimensions, the number of ribs, and the inclination angle of the transverse grooves cooperate in determining the overall performance of the pneumatic tire. In particular, these factors determine the amount of tread that contacts the road, and hence the traction and control of the vehicle riding on the tires. The nonskid or groove depth determines the ability of the intersecting circumferential and transverse grooves to channel water.

In a new condition, tread patterns are designed with compromises between various design parameters in order to optimize performance. As a tire wears, the parameter choices that optimized performance of the tire's tread pattern in the unworn state may not be optimal at reduced groove depths. For example, a new tire construction may be designed with a tread pattern having raised blocks in which noise reduction, due to the high nonskid, is a controlling factor. However, blocks that provide a balanced tire behavior in the new condition may not exhibit optimized noise reduction and hydroplaning control in a worn condition as the groove depth diminishes. As the tread wears, the noise created by contact between the road-contacting surfaces of the tread blocks and the road diminishes. However, worn tires with conventional blocks are significantly more susceptible to hydroplaning than new tires.

For these and other reasons, it would be desirable to provide a pneumatic tire that addresses these and other deficiencies of conventional pneumatic tires.

SUMMARY OF THE INVENTION

In one embodiment of the present invention, a pneumatic tire comprises a carcass having an axis of rotation and a tread disposed radially outward of the carcass. The tread includes an equatorial plane bisecting the tread perpendicular to the axis of rotation, a plurality of grooves, and a plurality of raised tread blocks located between the grooves. Each of the tread blocks has a road-contacting surface and at least one wall extending from the road-contacting surface so as to border at least one of the grooves. The at least one wall is oriented with a first angular orientation relative to the equatorial plane at a first groove depth below the road-contacting surface and with a second angular orientation relative to the equatorial plane at a second groove depth that differs from the first angular orientation.

In another aspect, a method is provided for adjusting the water removal characteristics of a tire tread with tread wear. The tire tread has an equatorial plane, a plurality of grooves, and a plurality of tread blocks located between the grooves. Each of the tread blocks has a road-contacting surface and at least one wall extending from the road-contacting surface so as to border at least one of the grooves. The method includes orienting the at least one wall with a first angular orientation relative to the equatorial plane at a first groove depth and orienting the at least one wall with a second angular orientation differing from the first angular orientation at a second groove depth less than or shallower than the first groove depth.

By virtue of the foregoing, there is provided an improved pneumatic tire that addresses various deficiencies of conventional pneumatic tires. The pneumatic tire of the present invention includes tread blocks with skewed walls. The pattern arrangement of tread blocks produces a footprint that is optimized for noise reduction and/or irregular wear in the new condition. In a worn condition, the pattern arrangement of tread blocks is optimized to produce a footprint that improves the balance between noise reduction and hydroplaning performance. The metamorphosis between these two states is produced by changing the angular orientation of at least one wall of, preferably, each tread block in at least one tread rib relative to the tire's equatorial plane.

BRIEF DESCRIPTION OF THE DRAWINGS

The accompanying drawings, which are incorporated in and constitute a part of this specification, illustrate an embodiment of the invention and, together with a general description of the invention given above, and the detailed description given below, serve to explain the invention.

DEFINITIONS

Figure 1:
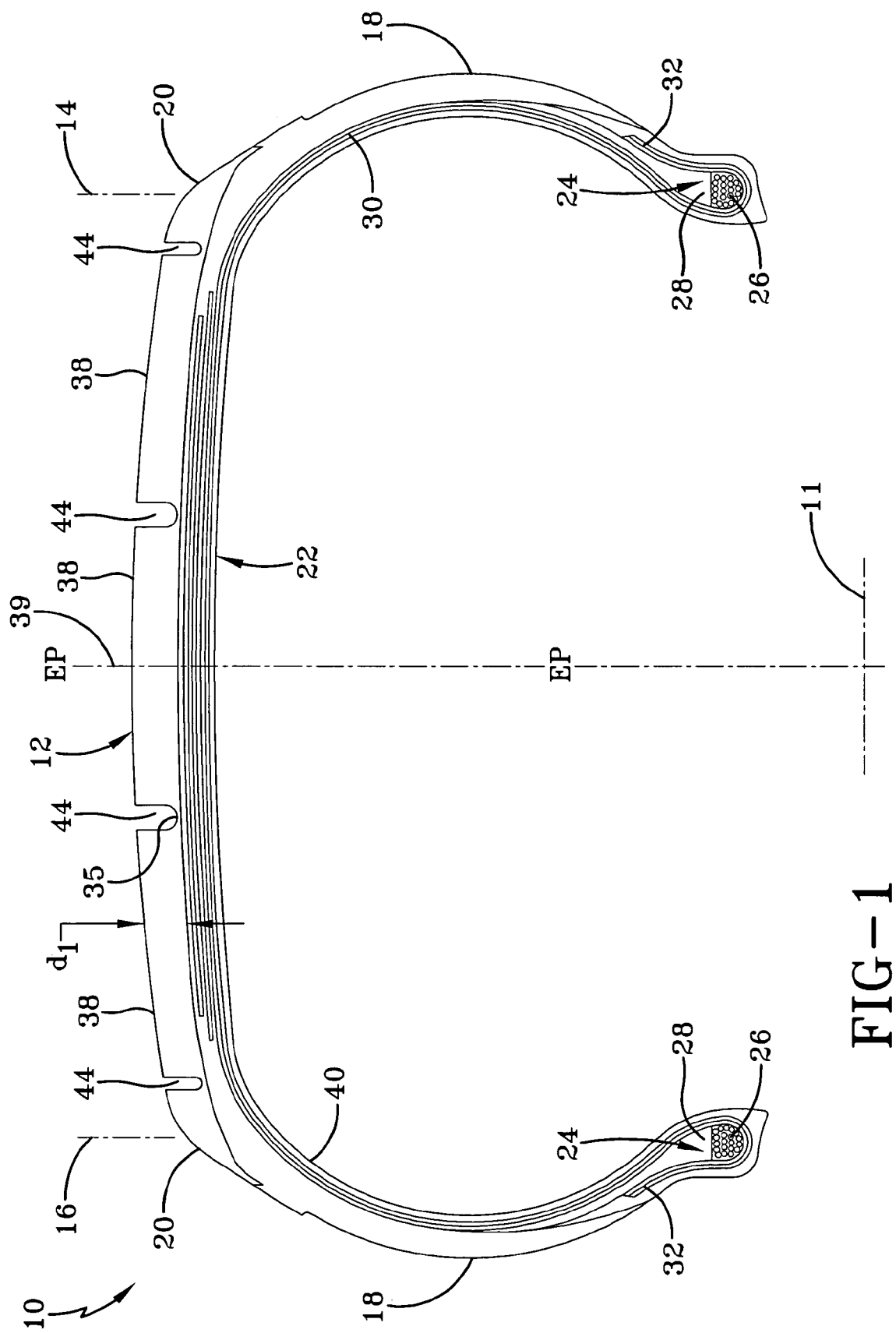
FIG. 1 is a cross-sectional view of a tire in accordance with the present invention.

"Apex" means an elastomeric filler located radially above the bead core and between the plies and the turnup ply.

"Axial" and "axially" mean the lines or directions that are parallel to the axis of rotation of the tire.

"Bead" means that part of the tire comprising an annular tensile member wrapped by ply cords and shaped to fit the design rim, with or without other reinforcement elements such as flippers, chippers, apexes, toe guards and chafers.

"Carcass" means the tire structure apart from the belt structure, tread, undertread, and sidewall rubber over the plies, but including the beads.

"Circumferential" means circular lines or directions extending along the surface of the sidewall perpendicular to the axial direction.

"Cord" means one of the reinforcement strands of which the plies in the tire are comprised.

"Cut belt or cut breaker reinforcing structure" means at least two cut layers of plies of parallel cords, woven or unwoven, underlying the tread, unanchored to the bead, and having both left and right cord angles in the range from 10 degrees to 33 degrees with respect to the equatorial plane of the tire.

"Equatorial plane (EP)" means the plane perpendicular to the tire's axis of rotation and passing through the center of its tread.

"Footprint" means the contact patch or area of contact of the tire tread with a flat surface at zero speed and under design load and pressure.

"Groove" means an elongated void area in a tread that may extend circumferentially or laterally about the tread in a straight, curved, or zigzag manner.

"Hydroplaning" refers to a condition wherein a tire in motion loses traction during wet pavement conditions because the tire is not in contact with the surface. The tire is in contact only with a film of liquid on the surface.

"Lateral" means a direction parallel to the axial direction, as in across the width of the tread or crown region.

"Lateral edge" means the axially outermost edge of the tread as defined by a plane parallel to the equatorial plane and intersecting the outer ends of the axially outermost traction lugs at the radial height of the inner tread surface.

"Leading" refers to a portion or part of the tread that contacts the ground first, with respect to a series of such parts or portions, during rotation of the tire in the direction of travel.

"Nonskid" means depth of grooves in a tire tread.

"Normal inflation pressure" refers to the specific design inflation pressure and load assigned by the appropriate standards organization for the service condition for the tire.

"Normal load" refers to the specific design inflation pressure and load assigned by the appropriate standards organization for the service condition for the tire.

"Pneumatic tire" means a laminated mechanical device of generally toroidal shape, usually an open-torus having beads and a tread and made of rubber, chemicals, fabric and steel or other materials.

"Radial" and "radially" mean directions radially toward or away from the axis of rotation of the tire.

"Rib" means a circumferentially extending strip of rubber on the tread which is defined by at least one circumferential groove.

"Shoulder" means the upper portion of sidewall just below the tread edge.

"Sidewall" means that portion of a tire between the tread and the bead area.

"Tire design load" is the base or reference load assigned to a tire at a specific inflation pressure and service condition; other load-pressure relationships applicable to the tire are based upon that base or reference load.

"Tread" means a molded rubber component which, when bonded to a tire casing, includes that portion of the tire that comes into contact with the road when the tire is normally inflated and under normal load.

"Tread width" means the arc length of the road contacting tread surface in the axial direction, that is, in a plane parallel to the axis of rotation of the tire.

"Turn-up ply" refers to an end of a carcass ply that wraps around one bead only.

DETAILED DESCRIPTION

With reference to the FIG. 1, a pneumatic tire 10 of the present invention includes a road-contacting tread 12 extending between lateral edges 14, 16, a pair of sidewalls 18 each extending from one of the lateral edges 14, 16, respectively, a shoulder 20 defined at the juncture between each sidewall 18 and tread 12, and a carcass 22 defining a support structure for tire 10. The tread 12 and sidewalls 18 are comprised of a suitable material, such as a natural or synthetic rubber compound, selected in accordance with engineering standards that are widely known in the tire art. Tire 10 has a midcircumferential or equatorial plane 36 bisecting tire 10 midway between lateral edges 14, 16. Generally, the tire 10 includes an axis of rotation 11 that orthogonally intersects the equatorial plane 39.

The carcass 22 includes a pair of beads 24 each having an annular inextensible tensile member 26 and an apex 28. Each of the sidewalls 18 is terminated by a corresponding one of the beads 24, which provide support for the tire 10 and seal air in the tire 10. The carcass 22 further includes at least one composite ply structure 30 having opposite turn-up ply ends 32 each wrapped about one of the beads 24. Tire 10 further includes a belt package 34 typically characterized by a plurality of individual cut belt plies and/or spiral wound belt layers. The construction of the belt package 34 varies according to the tire construction. The plies of the ply structure 30 and the belt package 34 generally consist of cord reinforced elastomeric material in which the cords are steel wire or polyamide filaments and the elastomer is a vulcanized rubber material. The cord reinforced elastomeric material constituting the ply structure 30 and belt package 34 are encased in and bonded to a suitable material, such as a natural or synthetic rubber compound, selected in accordance with engineering standards that are widely known in the tire art.

A set of tires 10 is placed on a vehicle, such as an automobile. When each tire 10 is mounted on a rim and placed on the vehicle, the tread 12 protects the carcass 22 and belt package 34 while providing traction for the tire 10 on the road surface. Tire 10 contains an inflation fluid, like nitrogen, air, or another gas or gas mixture, that sustains the vehicle load. A liner 40, which may be formed of, for example, halobutyl rubber, defines an air impervious chamber for containing the air pressure when the tire 10 is inflated.

Figure 2:
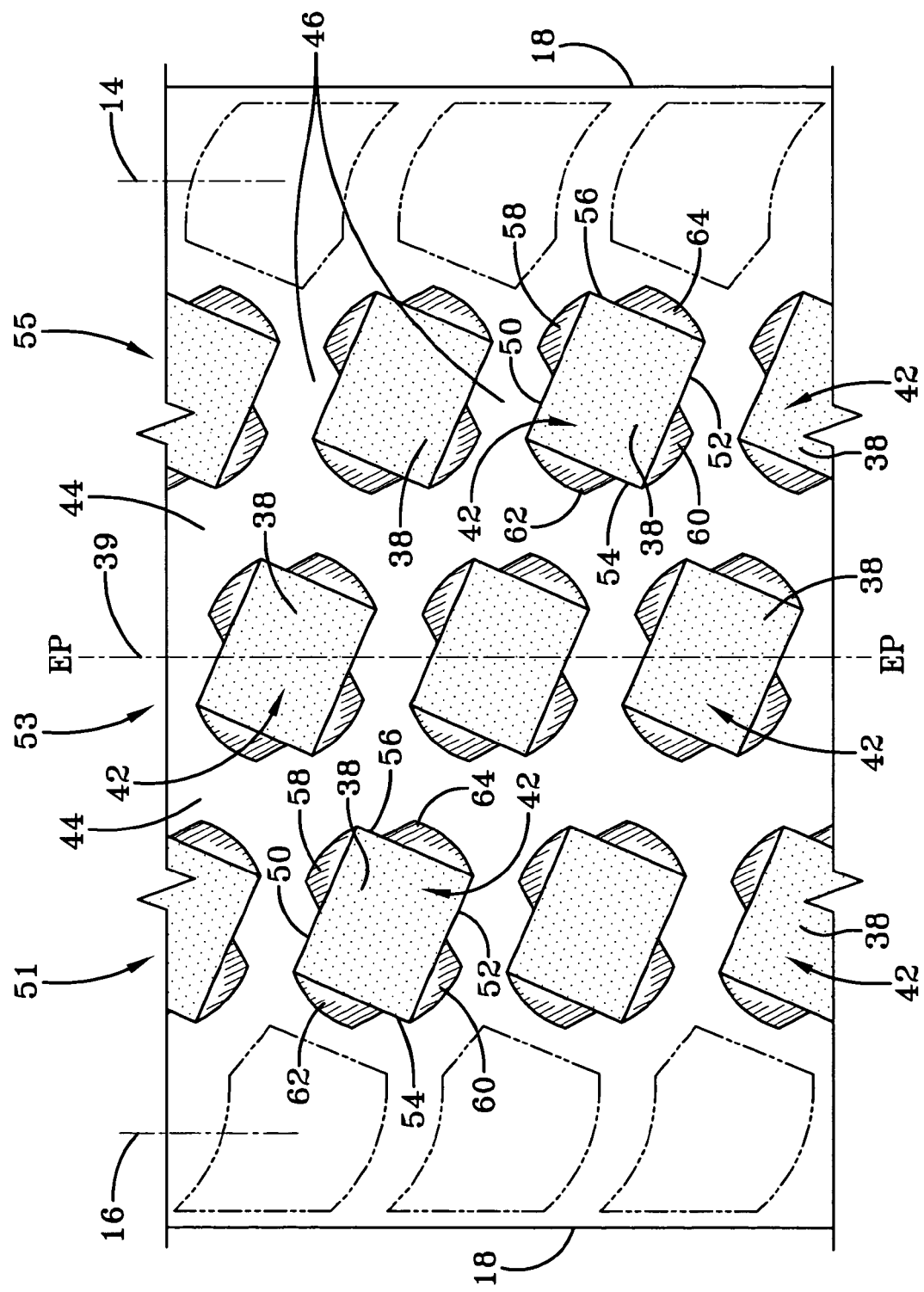
FIG. 2 is an enlarged fragmentary view of the tread of the tire of FIG. 1.

With reference to FIGS. 1 and 2, the tread 12 is partitioned into a plurality of raised tread blocks 42 located between a plurality of continuous circumferential grooves 44 and a plurality of transverse or lateral grooves 46 that are inscribed with an intersecting relationship into the tread 12. Preferably, the circumferential grooves 44 are substantially parallel to one another so that the tread blocks 42 are arranged in three ribs, indicated generally at 51, 53, 55, that extend circumferentially about the tire 10. Adjacent ribs 51, 53, 55 are separated from each other by one of the circumferential grooves 44.

Each of the lateral grooves 46 either extends between adjacent circumferential grooves 44 or between a circumferential groove 44 and one of the lateral edges 14, 16. The lateral grooves 46 extend across the width (i.e., axial dimension) of the tire 10 transversely relative to the equatorial plane 39. Each block 42 is individually separated from an adjacent block 42 in the same rib 51, 53, 55 by one of the lateral grooves 46.

The circumferential and lateral grooves 44, 46 represent elongated void areas in tread 12. The blocks 42 project outwardly from a base surface 35 of the tread 12 that is defined as a curved surface containing the bases of the individual grooves 44, 46. The nonskid is represented by a distance or depth measured from a road contacting surface 38 of each tread block 42 to the base surface 35. When driving on wet roads, the lateral grooves 44 transfer a continuous flow of water transversely or laterally out of the footprint of the tread 12 for expulsion through the shoulders 20. The presence of the lateral grooves 46 alleviates the build up of water back pressure in front of the tread 12 and assists in maintaining rubber contact between the tread 12 and the road surface.

Each tread block 42 includes a radially outermost, road-contacting surface 38 that contacts the road surface when periodically within the boundary of the tire footprint as tire 10 rotates. Each of the tread blocks 42 has a dimension in the circumferential direction of the tire 10 and a shorter dimension in the transverse direction of tire 10 that may be the same or differ from the circumferential direction. The tread blocks 42 may be provided with sipes (not shown). Each road-contacting surface 38 is bounded by corners 50, 52, 54, 56 defined by the intersection between surface 38 and a corresponding one of walls 58, 60, 62, 64 that extend from surface 38 to base surface 35.

When viewed in a direction orthogonal to the axis of rotation 11 of tire 10, each of the tread blocks 42 has a polygonal cross-sectional profile. In alternative embodiments, the cross-sectional profile may be a quadrilateral, a trapezoid, or a parallelogram. The cross-sectional profile may have other polygonal shapes, such as triangular or pentagonal, or may be circular or another smooth curve defining a non-polygonal shape. The cross-sectional profile may change along the height of the tread blocks 42. For example, the number of sides may change from four to three along the height of each of the tread blocks 42.

Figure 7:
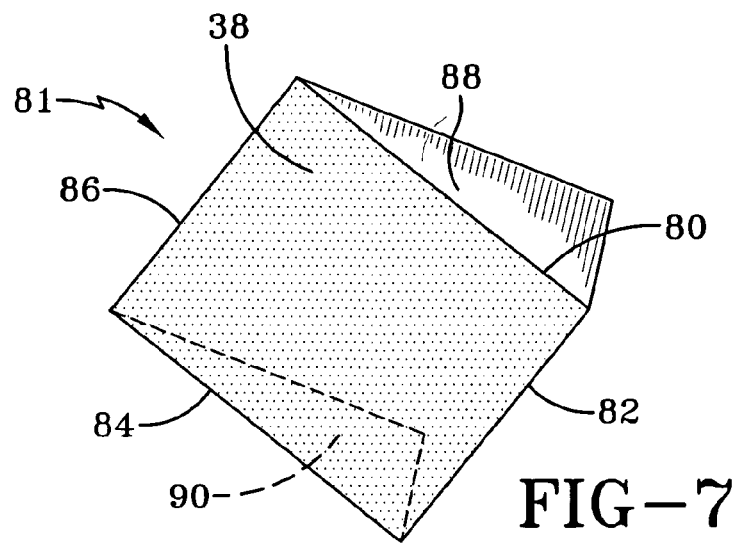

Due to the change in angular orientation, the four walls 58, 60, 62, 64 of tread block 42 spiral along the depth of grooves 44, 46. The spiral angle of each wall 58, 60, 62, 64 is equal to the difference in the angular orientation of the corresponding corners 50, 52, 54, 56 and the angular orientation of the four walls 58, 60, 62, 64 at their intersection with base surface 35. In alternative embodiments, less than all four walls 58, 60, 62, 64 of tread block 42 may spiral toward the base surface 35. The spiral angle may differ among the individual walls 58, 60, 62, 64 so that the corresponding corners 50, 52, 54, 56 have a different inclination change per unit groove depth (i.e., inclination change per unit block height). Different walls 58, 60, 62, 64 may also rotate in different directions, as indicated in FIG. 7. In addition, the change in angular inclination of corners any or all of the walls 58, 60, 62, 64 may occur over the full extent of the groove depth or may occur over only a portion of the groove depth. The change in angular orientation may be gradual or smooth or, alternatively, may be more abruptly or drastic.

With continued reference to FIGS. 1 and 2, each of the tread blocks 42 has corners 50, 52, 54, 56 that are defined at the road-contacting surface 38 by the intersection of a corresponding one of a plurality of walls 58, 60, 62, 64 with surface 38. Corners 50 and 52 lead and trail, respectively, the tread block 42 in a circumferential direction. However, the invention is not so limited as the corners 50, 52, 54, 56 may be rounded or radiused instead of linear. The lateral grooves 46 change direction across the discontinuity defined by each of the circumferential grooves 44 so that the path to the shoulder 20 is non-linear. Corner 50 of one tread block 42 is generally parallel to corner 52 of the adjacent tread block 42 in each of the ribs 51, 53, 55.

The nonskid of tread 12 is defined by the groove depth or radial distance, $d_1$, measured from the road-contacting surface 38 to the base surface 35, as shown in FIG. 1. For simplicity and clarity, the depth of the nonskid is assumed to be identical and uniform across the width of the tread 12, although the invention is not so limited.

For example, lateral grooves 46 may have a position-dependent depth that varies across the width of the tread 12.

Each of the corners 50, 52, 54, 56 is oriented at a first angle relative to equatorial plane 39. However, the angular orientation of the walls 58, 60, 62, 64 relative to equatorial plane 39 changes as a function of the groove depth between the road-contacting surface 38 and the base surface 35.

In use, the depth of grooves 44, 46 will decrease as the tread 12 wears. As the grooves 44, 46 become shallower, the corners 50, 52, 54, 56 approach the base surface 35. As a result, the road-contacting surface 38 is at a different resultant height above the base surface 35 and, hence, cuts through a different plane of the original tread block 42. As this occurs, the angular orientation of each of the corners 50, 52, 54, 56 changes relative to the equatorial plane 39.

Figure 3:
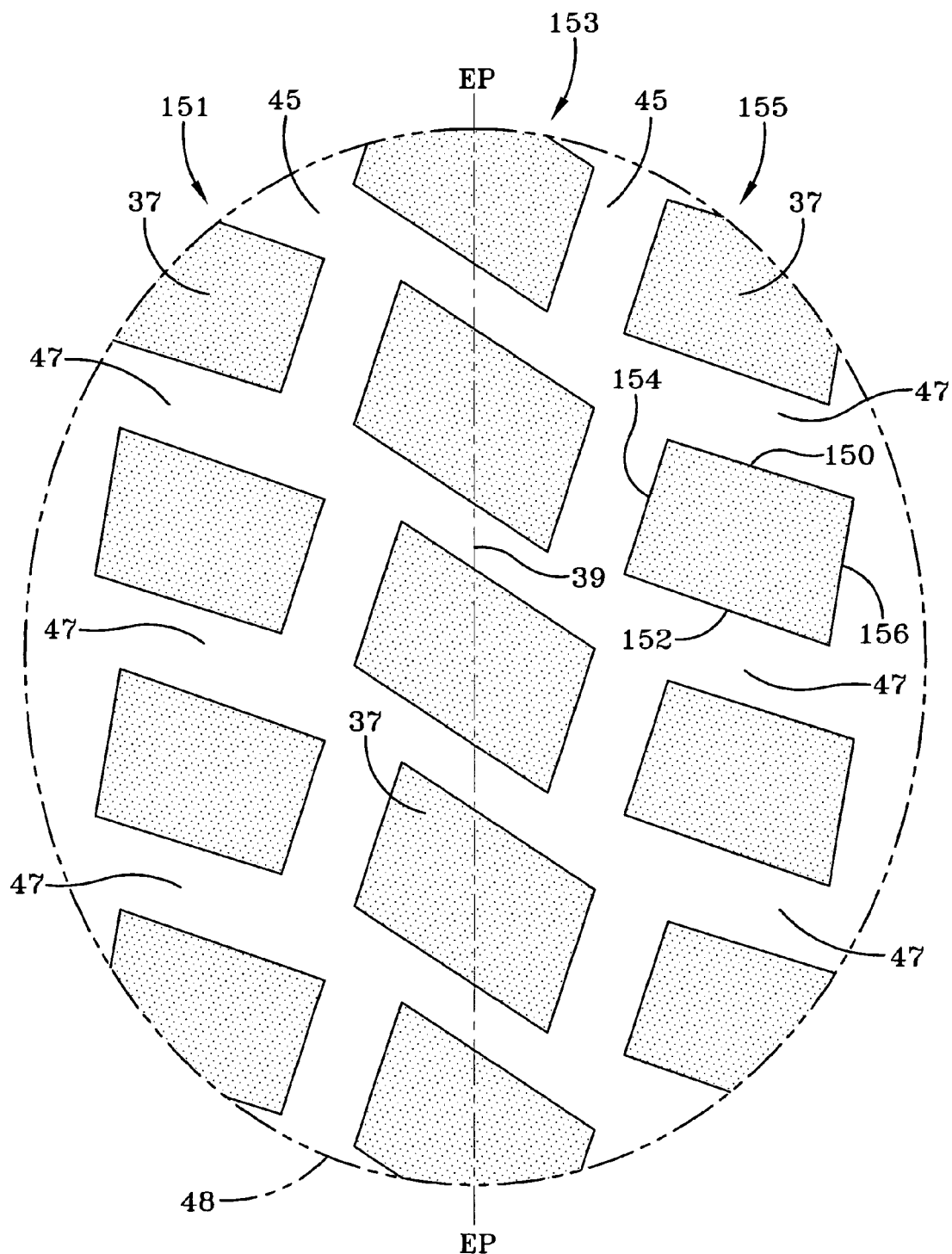
FIG. 3 is a diagrammatic view of a footprint of the tire having tread blocks in accordance with an alternative embodiment of the invention in which the tread has a first groove depth.
Figure 4:
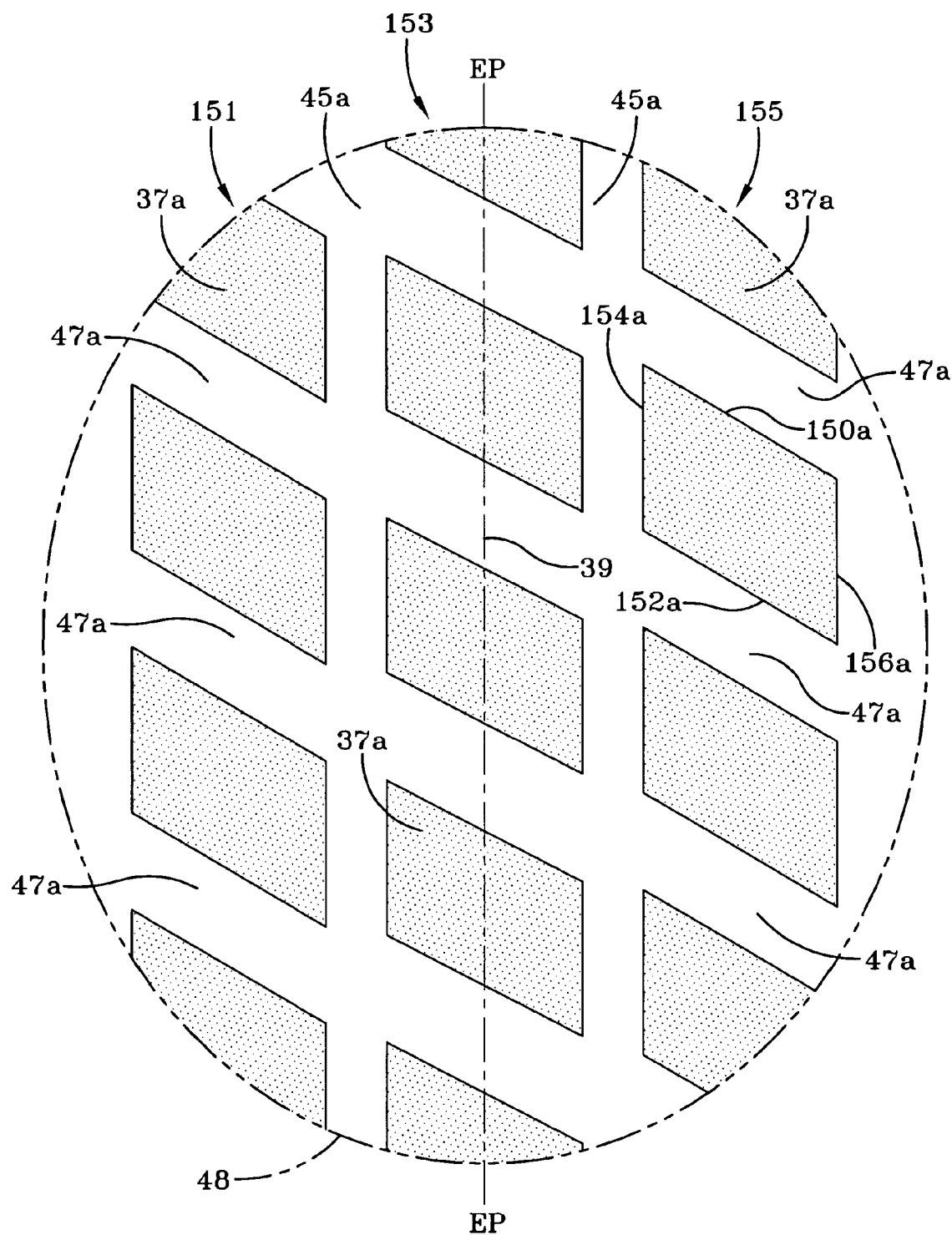
FIG. 4 is a diagrammatic view of a tire footprint similar to FIG. 3 in which the tread has a second groove depth.

With reference to FIGS. 3 and 4, footprints are shown for a tread, similar to tread 12, patterned with tread blocks, similar to tread blocks 42, in accordance with an alternative embodiment of the invention. The footprint of the tread represents the area of contact or contact patch 37 of the road-contacting surface of each tread block with a flat surface, such as a road surface, at zero speed and under design load and pressure. The footprint is circumscribed by an elliptical edge 48.

The footprint of FIG. 3 is illustrated with the tread at a first groove depth, which may be the original groove depth $d_1$ in the new or unused condition or may be a worn depth shallower than the original groove depth. The footprint includes channels 45 representative of circumferential grooves, similar to circumferential grooves 44 (FIG. 2), and channels 47 representative of lateral grooves, similar to lateral grooves 46 (FIG. 2). Channels 45, 47 define the open areas between the contact patches 37. The channels 47 in the footprint are inclined or angled diagonally relative to the equatorial plane 39. Channels 47 are partially obstructed and have a pronounced zig-zag appearance as the corners 54, 56 of walls 62, 64 are not coplanar with the equatorial plane 39 but instead are oriented at the first angle relative to the equatorial plane 39.

Each contact patch 37 is bounded by edges 150, 152, 154, 156. It is apparent from FIG. 3 that, although each contact patch 37 is a polygon of four sides or a quadrilateral, the inclination angle of each of the edges 150, 152, 154, 156 relative to the equatorial plane 39 differs as a function of a row 151, 153, 155 in which the contact patch 37 belongs. Contact patches 37 in the central row 153 are parallelograms with edges 150, 152 parallel and edges 154, 156 parallel. Contact patches 37 in the peripheral rows 151, 155 are trapezoids with only edges 150, 152 parallel. Edges 154, 156 of contact patches 37 in the peripheral rows 151, 155 also differ in inclination angle relative to the equatorial plane 39. The orientation of edges 150, 152, 154, 156 corresponds to, and is a mirror image of, the orientation of the corners of the tread blocks on the tread.

With reference to FIG. 4, a footprint is shown with the tread at a second groove depth that is shallower than the first groove depth for the footprint shown in FIG. 3. This represents a condition with greater tread wear than at the first groove depth, so that contact patches 37a differ from contact patches 37 (FIG. 3) in appearance and may also differ in contact area. Channels 45a, 47a represent the transformation of channels 45, 47, respectively, from their arrangement at the first groove depth shown in FIG. 3 to their new arrangement at the second groove depth shown in FIG. 4. Adjacent channels 45a have less prominent changes in direction diagonally across the width of the footprint. For purposes of illustration only, lateral channels 47a are depicted as being aligned nearly linear or linear diagonally across the width of the tread. In addition, the circumferential channels 45a are less obstructed than channels 45 (FIG. 3) because of less prominent changes in direction. As a result, the network of channels 45a, 47a at the second groove depth presents a lateral path with lower flow resistance, as compared with the first groove depth as shown in FIG. 3, which makes channels 45a, 47a more effective and efficient for expelling water out of the tire footprint for expulsion through the shoulders 20 (FIG. 1) when driving on wet roads. Hence, the tread in the reduced nonskid condition of FIG. 4 has an improved hydroplaning performance, as compared with a conventional tire in which the footprint of the worn tread would be substantially identical to the footprint shown in FIG. 3.

The transformation from channels 45, 47 (FIG. 4) to channels 45a, 47a occurs because the edges 150, 152, 154, 156 of the contact patches 37a have a different angular orientation or inclination angle relative to the equatorial plane 39 at the second groove depth as compared with their orientation at the first groove depth (FIG. 3). The change in orientation results from the change in angular orientation of the corners of the road-contacting surfaces of the tread blocks relative to the equatorial plane 39. As is apparent, the contact patches 37a are all approximately shaped as parallelograms. Hence, the walls of the tread blocks defining the contact patches 37, 37a at the two different groove depths are configured to provide the footprints shown in FIGS. 3 and 4 at the different groove depths.

Figure 5:
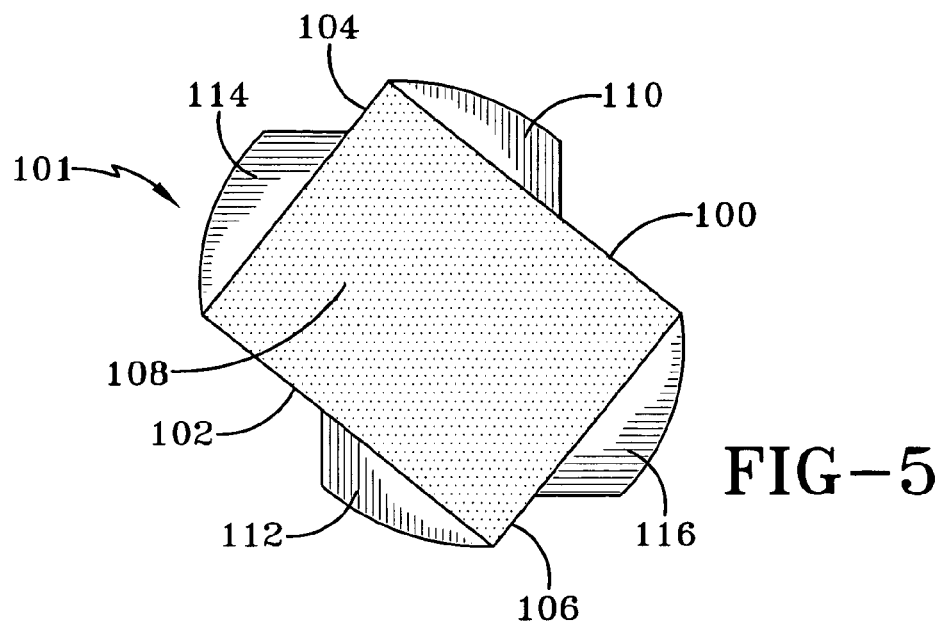
FIGS. 5, 6 and 7 are views of tread blocks for tires constructed in accordance with alternative embodiments of the present invention.

With reference to FIG. 5, which like reference numerals refer to like features in FIGS. 1 and 2 and in accordance with an alternative embodiment of the present invention, a representative tread block 101, similar to tread block 42 (FIG. 2), has four walls that change orientation with groove depth, but in an opposite rotational sense from the tread blocks 42 of FIG. 2. Corners 100, 102, 104, 106, which are arranged about the periphery of the rectangular road-contacting surface 108, are defined by an intersection between surface 108 and corresponding walls 110, 112, 114, 116, respectively, extending to the base of an adjacent groove.

Figure 6:
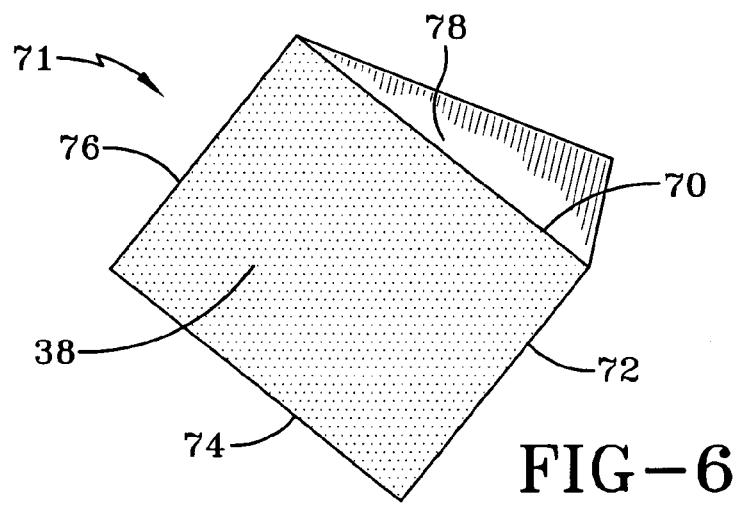

FIG. 6 shows a representative tread block 71, similar to tread block 42, having a single wall that changes orientation with groove depth. Corners 70, 72, 74, 76, which are arranged about the periphery of the rectangular road-contacting surface 38, are defined by an intersection between surface 38 and a corresponding wall extending to the base of an adjacent groove, of which only a wall 78 is visible in FIG. 6. The hidden walls (not shown) are inclined at a constant inclination angle relative to the equatorial plane 39 (FIG. 2) and approximately equal to the inclination angle of the corresponding corners 70, 72, 74, 76. Wall 78, in contrast, changes its inclination angle relative to the equatorial plane 39 as a function of groove depth, similar to walls 58, 60, 62, 64 (FIG. 5).

Wall 78 may bound one of the circumferential grooves 44 (FIG. 2) or one of the lateral grooves 46 (FIG. 2). If wall 78 were bounding one side of one of the circumferential grooves 44, the inclination of the portion of channel 45 adjacent to wall 78 defined by groove 44 in the tire footprint would change as the tread 12 wears. Similarly, if wall 78 bounds one side of one of the lateral grooves 46, the inclination of the channel 47 defined by groove 46 in the tire footprint would change as the tread 12 wears.

FIG. 7 shows a representative tread block 81, similar to tread block 42, having two walls that change orientation with groove depth. Corners 80, 82, 84, 86, which are arranged about the periphery of the rectangular road-contacting surface 38, are defined by an intersection between surface 38 and a corresponding wall extending to the base of an adjacent groove, of which only walls 88 and 90 are visible in FIG. 7. The non-visible walls (not shown) are inclined at a constant inclination angle relative to the equatorial plane 39 (FIG. 2) and approximately equal to the inclination angle of the corresponding corners 82 and 86. Walls 88 and 90, in contrast, change their inclination angle relative to the equatorial plane 39 as a function of groove depth, similar to walls 58, 60, 62, 64 (FIG. 5). The inclination angle of wall 90 changes in an opposite rotational sense to the inclination angle of wall 88. In other words, wall 90 effectively creates an undercut beneath the road-contacting surface 38 proximate to corner 84.

While the invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. Thus, the invention in its broader aspects is therefore not limited to the specific details, representative apparatus and method, and illustrative examples shown and described. Accordingly, departures may be made from such details without departing from the spirit or scope of applicants' general inventive concept.

What is claimed is:

1. A pneumatic tire comprising:
a carcass having an axis of rotation; and
a tread disposed radially outward of said carcass, said tread including an equatorial plane bisecting said tread perpendicular to said axis of rotation, a plurality of lateral grooves intersecting said equatorial plane, first and second ribs extending circumferentially about the tread so as to intersect said plurality of lateral grooves, a first plurality of tread blocks defining said first rib, and a second plurality of tread blocks defining said second rib;
wherein a first tread block in said first rib and a second tread block in said second rib each include a road-contacting surface, a first wall extending from said road-contacting surface and bordering one of said lateral grooves, and a second wall extending from said road-contacting surface and bordering another one of said lateral grooves, each of said first walls having a first angular orientation relative to said equatorial plane at a first groove depth at or below the road-contacting surface and a second angular orientation relative to said equatorial plane at a second groove depth smaller than the first groove depth, each of said first walls having a spiral angle equal to the difference between the first and second angular orientations, the spiral angle of said first wall of said first tread block differing from the spiral angle of said first wall of said second tread block such that said lateral groove bordered by said first walls defines a non-linear path across said first and second ribs at the first groove depth and a substantially linear path across said first and second ribs at the second groove depth;
wherein each of said tread blocks in said first rib has a first cross-sectional profile in a direction orthogonal to said axis of rotation at the first groove depth and a second cross-sectional profile in a direction orthogonal to said axis of rotation at the second groove depth, said first cross-sectional profile being a trapezoid and second cross-sectional profile being a parallelogram.

2. The pneumatic tire of claim 1 wherein each of said tread blocks in said second rib has a polygonal cross-sectional profile in a direction orthogonal to said axis of rotation.

3. The pneumatic tire of claim 2 wherein said polygonal cross-sectional profile is a quadrilateral.

4. The pneumatic tire of claim 3 wherein said quadrilateral cross-sectional profile is a parallelogram.

5. The pneumatic tire of claim 1 wherein said equatorial plane bisects said second rib.

6. The pneumatic tire of claim 1 wherein said tread further includes a plurality of circumferential grooves intersecting said plurality of lateral grooves, said first tread block in said first rib and said second tread block in said second rib each having a third wall extending from said road-contacting surface and bordering one of said circumferential grooves, each of said third walls having a first angular orientation relative to said equatorial plane at the first groove depth and a second angular orientation relative to said equatorial plane at the second groove depth, the spiral angle of said third wall of said first tread block differing from the spiral angle of said third wall of said second tread block.

7. The pneumatic tire of claim 1 wherein each of said tread blocks in said second rib has a parallelogram cross-sectional profile in a direction orthogonal to said axis of rotation at the first and second groove depths.

8. The pneumatic tire of claim 1 wherein said tread further includes a third plurality of tread blocks defining a third rib extending circumferentially about said tread, and wherein a third tread block in said third rib includes a road-contacting surface, a first wall extending from said road-contacting surface and bordering said lateral groove bordered by said first wall of said second tread block, and a second wall extending from said road-contacting surface and bordering said lateral groove bordered by said second wall of said second tread block, said first wall of said third tread block having a first angular orientation relative to said equatorial plane at the first groove depth and a second angular orientation relative to said equatorial plane at the second groove depth so as to provide said first wall of said third tread block with a spiral angle, the spiral angle of said first wall of said third tread block differing from the spiral angle of said first wall of said second tread block.

9. The pneumatic tire of claim 1 wherein said first wall of said first tread block has a clockwise spiral angle measured in a direction from said road-contacting surface toward said axis of rotation and said first wall of said second tread block has a counterclockwise spiral angle.

* * * * *